Nov. 1, 1966    D. L. CRAMP    3,282,364
MOTOR VEHICLE HAVING FRICTIONALLY-DRIVEN TRACTION WHEEL
Filed July 31, 1964    3 Sheets-Sheet 2
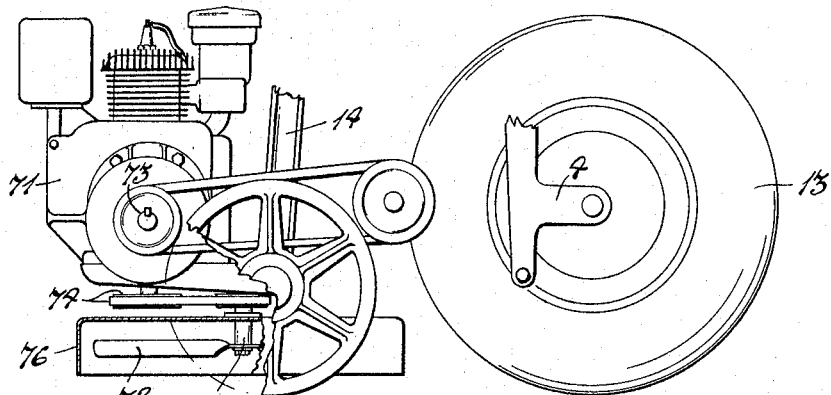
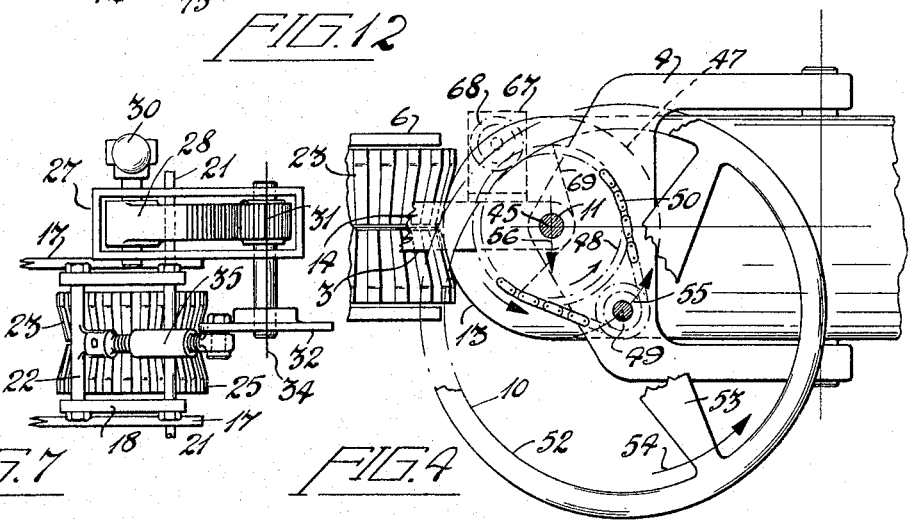
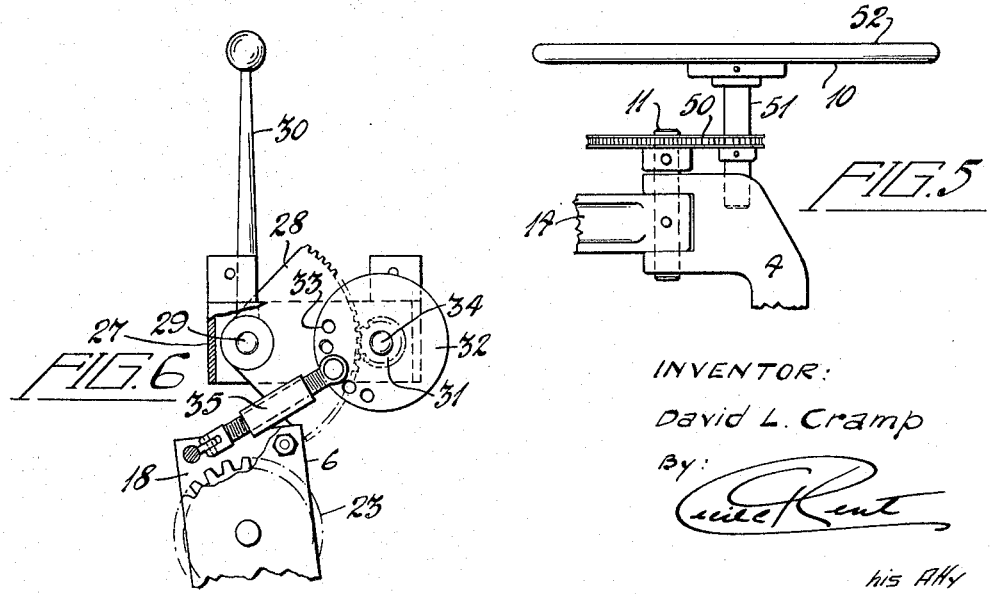
INVENTOR:
David L. Cramp
By:
his Atty

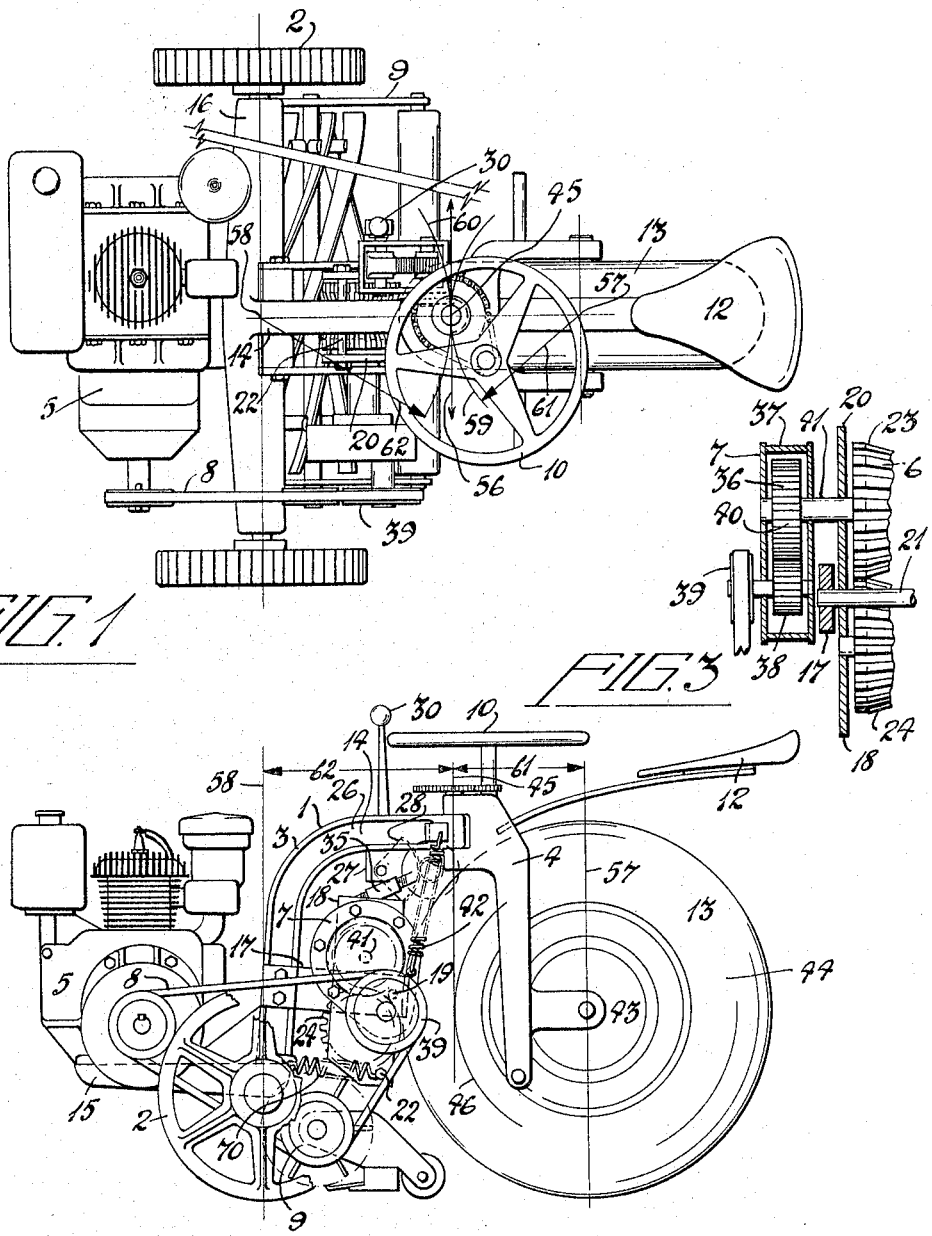

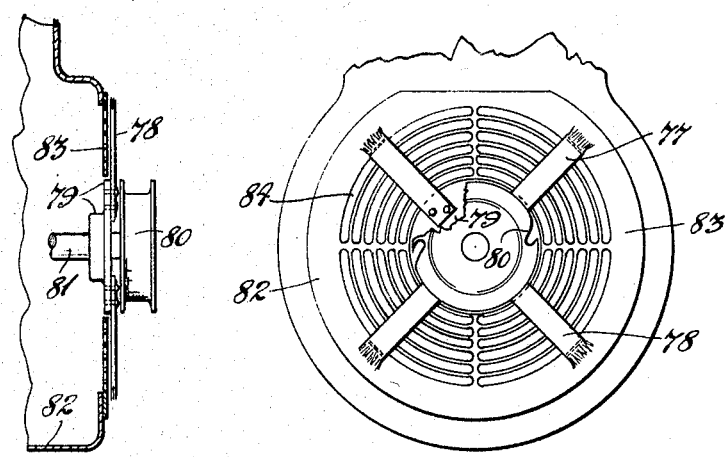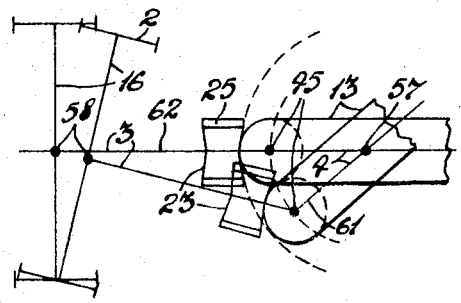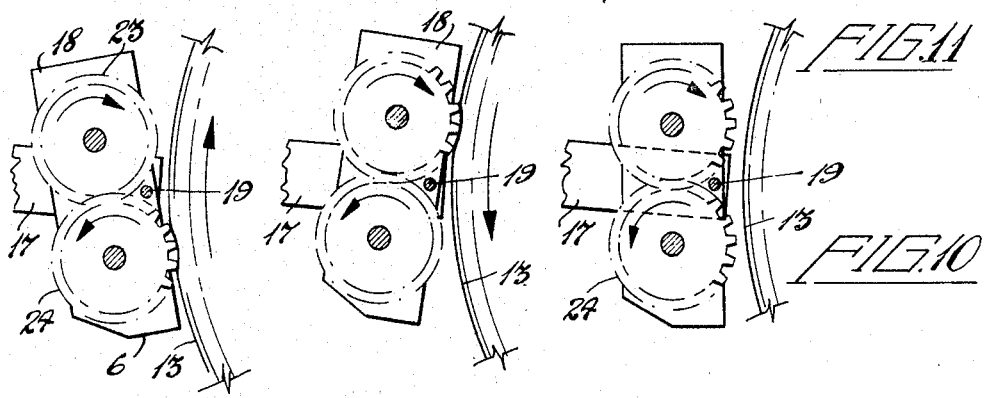

United States Patent Office 3,282,364
Patented Nov. 1, 1966

3,282,364
MOTOR VEHICLE HAVING FRICTIONALLY-DRIVEN TRACTION WHEEL
David L. Cramp, Sesekinika Lake, Ontario, Canada
Filed July 31, 1964, Ser. No. 386,662
13 Claims. (Cl. 180—26)

The present invention relates to automotive vehicles, but particularly work vehicles such as self-propelled and rideable, lawnmowers, lawn-rollers, snow-plows, golf-cars, orchard-cultivators, industrial rotary sweeping-brushes, floor-scrubbers, sanders, fork-lift trucks, mailman's hand delivery trucks, and the like, an object being to provide a vehicle having the following characteristics:

A framework comprising a chassis and a fork assembly which two parts of the framework are pivotally connected about a vertical axis, the fork assembly having journalled therein a large diameter pneumatic driving wheel having an arcuate tread, above which the operator may be seated, and a propulsion unit driven from a source of power on the chassis and positioned between the source of power and the drive wheel, the said propulsion unit being in direct frictional contact with the tread of the traction-wheel and horizontally pivoted to the chassis so as to swing within limits about a fulcrum which brings one of its two intermeshing gears into contact with the drive wheel tread and hence move the vehicle in one direction or the other with a simple shift of a single lever, and without the necessity for any other reversing mechanism, a "neutral" position being provided when both gears are out of contact with the tread.

Further objects of the present invention reside in providing a novel steering method actuated by swivelling the aforesaid pneumatic drive wheel at the locus of pivotal connection between the aforesaid chassis and fork assembly whereby (a) transverse friction between the driving pinions of the propulsion unit and the tread of the drive wheel is materially reduced particularly when the vehicle is moving, however slowly, and (b) a constant frictional co-efficient is maintained between drive wheel and driving pinions regardless of their angular relationship during the turning process so that speed and power at such times remains substantially the same as during linear travel.

A further object flowing from the statement of the last preceding paragraph is to provide, for the purpose just stated, an axially vertical pivotal connection between a chassis and fork assembly which, if produced downwardly would be approximately tangent to the centreline of the arc of the tire-tread which contributes to the aforesaid reduction of transverse friction.

A still further object for reducing yet more the aforesaid transverse co-efficient of friction between the members of the propulsion unit and the drive wheel resides in the provision of a novel steering means by virtue of which, when such means are rotated, the fork assembly and chassis tend to move in opposite directions. This has the effect of still further causing the arcuate tire surface and the concave surfaces of the spurs within the propulsion unit to roll transversely against each other rather than frictionally slewing against each other as will hereinafter become more readily apparent.

A further object of the present invention is to provide, as part of the propulsion unit or traction-wheel drive assembly, a speed reduction assembly which is suspended beside the supporting structure carrying the two-tire engaging spurs aforesaid, whereby the speed reduction assembly, with its housing, may rotate through a limited arc in a vertical plane and hence "float" so as to provide an automatic self tensioning assembly which is variable according to the load encountered being capable of permitting slippage with respect to any tool which is drivably connected between the power source and the said speed reduction assembly, such as the cutter of a lawnmower or the like.

Further objects inherent in the present invention reside in the extreme simplicity of its basic inventive concept, and consequent low cost of production as well as negligible maintenance expense; and its susceptibility to a great variety of usages having regard to the disposition in respect to dynamic balance of the main components.

With the foregoing objects in view, and such others as may become apparent as this specification proceeds, the present invention consists in the following arrangement and construction of parts, all as hereinafter more particularly described, reference being had to the accompanying drawings in which:

FIGURE 1 is a plan view, partly fragmented of a preferred embodiment of the present inventive concept as exemplified in a lawn mower.

FIGURE 2 is a side elevation of FIGURE 1.

FIGURE 3 is an enlarged fragmentary representation depicting the manner in which the speed reduction assembly is suspended from the driving element supporting structure.

FIGURE 4 is a plan view of the steering means associated with the embodiment of FIGURES 1 and 2.

FIGURE 5 is a side elevation of FIGURE 4.

FIGURE 6 is a side elevation depicting the means by which the driving element supporting mechanism is swung clockwise and counter-clockwise between forward, neutral, and reverse positions with respect to the driving wheel of the present vehicle.

FIGURE 7 is a plan view of FIGURE 6.

FIGURE 8 is a schematic representation in elevation showing the driving element supporting structure swung into forward driving position.

FIGURE 9 is a view similar to FIGURE 8 but showing the said supporting structure in reverse driving position.

FIGURE 10 is a view similar to FIGURES 8 and 9 but showing the driving element supporting structure in neutral position.

FIGURE 11 is a schematic plan representation illustrating the principle of the present invention as applied to the modification thereof exemplified in the accompanying FIGURES 1 and 2.

FIGURE 12 is a fragmentary side elevation of the present invention as applied to a rotary type lawn mower in contrast to a reel type lawn mower.

FIGURE 13 is a front elevation of the centrifugal reflector utilized as accessory to the present invention.

FIGURE 14 is a fragmentary cross-sectional elevation of FIGURE 13.

In the drawings like characters of reference designate similar parts in the several figures.

By way of preliminary description of the present invention and referring to the embodiment as exemplified in the form of a reel-type lawn mower in the accompanying FIGURES 1 and 2, the same consists essentially of a supporting framework collectively designated 1 including the pair of ground-wheels 2, the said framework also comprising the chassis collectively designated 3, and fork assembly collectively designated 4. Supported on the chassis 3 is a source of power collectively designated 5, a propulsion assembly collectively designated 6 and including a speed reduction assembly collectively designated 7 connected by drive-transmission means 8 (which also operates reel 9), to the source of power 5.

Steering means collectively designated 10 are connected to framework 1 via fork assembly 4 to cause reciprocal swivelling action as between the chassis 3 and fork assembly 4, at the point of pivotal connection 11. A seat 12 extends over the traction-wheel 13 capable of being rotated clockwise or counter clockwise by direct perimetrical contact with one of two driving elements to be described in greater detail hereinafter, forming part propulsion unit 6.

Having thus described the invention in terms of its principal component parts, a detailed description next follows.

Chassis 3 comprises the substantially right-angulated, upwardly extending principal member 14 which may be of any desired cross-sectional configuration. At the lower end thereof is a platform 15 on which the aforesaid (conventional) source of power 5 is mounted. Projecting from the junction of the member 14 and platform 15 is a horizontal supporter generally designated 16 to the ends of which ground wheels 2 are journalled and to which the aforesaid (conventional) reel assembly 9 is attached.

Propulsion unit 6 is carried by the member 14 via a pair of horizontally projecting bracket members 17 in spaced relationship on either side of the supporting structure collectively designated 18. The propulsion unit is fulcrummed at 19. Such supporting structure comprises a pair of vertically elongated, substantially rectangular, spaced and parallel plates 20.. The shaft 21 upon which the supporting structure is fulcrummed, spans the two plates 20. These plates are also held spaced by the connecting bolts 22.

Within the supporting structure 18, or in other words, between the aforesaid rectangular plates principally constituting the same are two inter-meshing driving elements collectively designated 23 and 24. These two elements may desirably be of the generally concavely cylindrical configuration depicted in the accompanying FIGURE 7. In this figure it will be observed that the outer portions 25 of the elements, or spurs or gear wheels, are parallel with their axes of rotation for reasons which will presently become manifest. Further, each of the elements 23 and 24 may in fact be comprised of two interfacially bolted gears with their teeth in staggered relationship to provide a smoother contact with traction-wheel 13 as will also presently become manifest.

The upper element 23 within supporting structure 18 engages the traction-wheel 13 for propelling the machine of the accompanying FIGURES 1 and 2 in a forwardly or leftward direction. The lower element 24 rotates the traction-wheel in the opposite direction when engaged therewith when the supporting structure 18 is swung through a limited vertical arc counter-clockwise about the fulcrum 19. The means for effecting such limited rotation will now be described reference being made particularly to the accompanying FIGURES 6 and 7 in this connection.

Suitably mounted upon the upper, horizontal portion 26 of the member 14 is a mounting structure collectively designated 27 and generally in the form of a framework within which is journalled for vertical rotation the toothed quadrant 28. The quadrant is journalled at 29 and is rotated as aforesaid under the influence of upstanding lever 30. The quadrant is in mesh with a small gear 31 keyed to rotate disc 32 provided with the set of apertures 33 which, it will be noted, are set progressively closer to the axis of rotation 34 to provide suitable adjustment as to the arc through which supporting structure 18 may swing to effect best contact as between elements 23 and 24 and traction wheel 13, and also to provide for such adjustment as will promote the most comfortable "feel" on the shift-stick 30 as between forward, reverse, and neutral positions of the elements 23 and 24, the neutral position obviously being that in which neither element is in contact with the traction wheel.

A turnbuckle 35 effects linkage between the upper end of housing structure 18 and the selected one of the apertures 33. As a result of all the foregoing it will be apparent that as shift-stick 30 is swung about the axis 29 clockwise or counter-clockwise, supporting structure 18 will rotate about fulcrum 19 on shaft 21.

Speed reduction assembly 7, in detail comprises gear means collectively designated 36, and a housing structure 37 within which the said gear means are journalled. The said gear means are connected at a lower point thereof (specifically by way of the lower and smaller gear 38 and pulley 39) to the source of power 5 via the transmission means or belt 8 already referred to. The larger and upper gear 40 is keyed to a shaft 41 extending through casing 37 and through supporting structure 18 so that it also carries the upper element 23.

As a result of the just described structure, it will be apparent that the speed reduction assembly collectively designated 7 is suspended from and is to one side of supporting structure 18. The assembly 7 is held biased counter-clockwise (to apply tension to the transmission assembly 8) by means of the spring 42 anchored at its lower end to the speed reduction assembly, and at its upper end to any convenient point upon the framework 1. Since the speed reduction assembly 7 is in floating operative association with the supporting structure 18 and may rotate through a limited vertical arc as explained, it will be apparent that when operating under heavy load, that the lower and smaller gear 38 will attempt to climb counter-clockwise up the larger gear 36 thus further tightening the transmission belt 8.

Having now described the novel means by which (a) drive is affected, and (b) automatic tensioning is provided under conditions of abnormal load, the novel steering means forming part of the present invention will be explained:

Traction wheel 13 comprises a hub 43, and a tire 44, which latter is of substantially cylindrical configuration considered annularly. At least it should have a tread of fairly small arcuate cross-sectional configuration for quick-turning as will presently become apparent.

The axis 45 of the pivotal connection 11, if produced downwardly would be tangent to the centreline 46 of the arc of tire 44. (Dotted line 47 in the accompanying FIGURE 4 indicates the annular cylindricality of tire 44 above referred to.) To the pivotal connection 11 between chassis 3 and fork assembly 4 is secured a sprocket wheel 48. Offset from it and secured against rotation about its own axis to fork assembly 4 (as also clearly illustrated in the accompanying FIGURE 4) is a sprocket wheel 49. A chain 50 connects sprocket wheels 48 and 49.

Steering means already collectively designated 10 comprise the stubshaft 51 coaxial with sprocket wheel 49. At the upper end of stub-shaft 51 is a large steering wheel 52 the spokes 53 of which of course are connected to stub-shaft 51. As a result, it follows from a contemplation particularly of the accompanying FIGURES 1, 2, 4 and 12 that when steering wheel 52 is rotated (for instance) counter-clockwise as indicated by arrow 54, offset sprocket wheel 49 tends to planet counter-clockwise as indicated by arrow 55 with respect to pivotal connection 11, and in doing so, to rotate the freely journalled pivotal connection also counter-clockwise.

The result of such movement is that swivelling in the directions of arrow 56 occurs about axis 45. In other words, a toggle or jack-knifing occurs about the axes 57 and 58 about which the traction wheel 13 and the chassis 3 rotate, such action also being indicated by the arcs and radii 59, 60, 61 and 62.

The reason for providing driving elements 23 and 24 which are substantial length between their ends, and for annularly concaving the center portions thereof as indicated in the accompanying FIGURE 7, will be apparent from the explanation just offered when considered particularly in relation to the accompanying diagrammatic FIGURE 11. From this figure it will be seen that since the radius 62 is greater than the radius 61, good frictional contact between the tire tread and the said elements is obtained over a very wide and "tight" steering arc.

It will thus be recognized that it is relative to the annular tire axis 46 (FIGURE 2) that the elements 23 or 24 are rotated horizontally, such axis being tangent to axis 45. These two axes are coincident as viewed in plan, FIG. 11. Thus elements 23 and 24 are "on centre" with respect to the tire regardless of the angle between chassis 3 and fork assembly 4. At the extreme limits of angular steering it is desirable for the maintenance of good traction, without biting into the tread too harmfully, that the portions 25 (FIG. 7 and 11) be flattened-off as already described. In FIG. 11 the chassis is depicted as having been pulled toward wheel 13 which is shown to have swivelled about axis 57 without rolling. However, it will readily be appreciated that whether or not there is mutual contraction of wheels 2 and 13 depends largely on ground conditions.

Although it has been stated that sprocket 49 is secured about its own axis of rotation and that sprocket wheel 48 is free, the latter may, if preferred, be fixed to the chassis, specifically the upper end of member 14 thereof, in which case sprocket wheel 49 turns on its own axis. Similarly, although not illustrated, the leverage-providing offset described, and which is provided by the location of the sprocket wheel 49 may, alternatively, be achieved as for example by means of an inverted angle-bracket 67 depicted in phantom lines in the accompanying FIGURE 4 secured to the upper, pivoted end of the member 14 and carrying, either in fixed or journalled relationship, the sprocket wheel 68. A stub-shaft would also be carried in the bracket 67 to which a steering wheel such as 52 would be attached. Then, in place of the large sprocket wheel 48, a gear-toothed quadrant the radial limits of which are indicated by the phantom lines 69 would be in mesh with pinion or gear 68, and would be secured as by welding to the fork assembly 4 to rotate the same about pivotal connection 11 in the manner already described.

Generally however the first embodiment of the steering means described is to be preferred, partly because of the greater radius of turning conveniently permitted thereby.

Reverting to supporting structure 18, just as a spring 42 is provided to bias the housing structure 37 counter-clockwise for the purpose stated, a spring 70 is provided to bias supporting structure 18 clockwise, the said spring being anchored at its opposite ends to the lower end of member 14 and the said supporting structure.

FIGURE 12 is included to illustrate an exemplary use of a horizontally drive-shafted source of power 71, the same in this case operating a conventional, rotary-type grass-cutter 72 through a set of bevel-gears (not shown) constituting well-known means for translating motion from the horizontal to the vertical, numeral 73 designating the motor drive-shaft, and 74 a pulley and belt assembly operating the rotary cutter-blade shaft 75 within its casing 76.

The centrifugal deflector collectively designated 77 in the accompanying FIGURES 13 and 14 consists of a set of radially disposed, outwardly projecting vanes 78 preferably of some stiff woven fabric, the same being secured at their inner ends to a rotatable hub 79 such as that usually disposed to the rear of the conventional motor-starting wheel 80 which of course is co-axial with drive-shaft 81, the drive-shaft extending through crank-case 82.

Secured against the crank-case is a conventional grille collectively designated 83 and usually provided with sets of circumferential slots 84. As the motor shaft rotates carrying the hub 79 and starting wheel 80, obviously the vanes 77, or deflectors, rotate continuously past the apertures 84 of grille 83. Thus they serve very effectively to repel and remove unwanted matter such as dead leaves and the like which are otherwise attracted by suctional adhesion in large quantity against the face of grille 83 and can quickly block it and starve the engine of needed air.

Since various modifications can be made to the novel subject-matter herein, without departing from the inventive concept which the same embodies, it is not intended that protection of this invention by Letters Patent should be interpreted as restricted to the particular modification or modifications thereof particularly described and exemplified.

What I claim as my invention is:

1. In an automotive vehicle, in combination, a ground-wheel supported framework, a steerable traction-wheel pivotally connected to said framework for swivelling motion about a vertical axis, and steering means for effecting said motion, a source of power on said framework, a propulsion unit operatively connected to said source of power, said traction-wheel including a tire having a tread of arcuate cross-sectional configuration, said propulsion unit including at least one driving-element rotatable about a horizontal axis in perimetrical contact with said tread, the axis of said pivotal connection, when produced downwardly being approximately tangent to a point on the annular centreline from which the radius of an arc on the horizontal cross-section of said tread springs, whereby swivelling of said traction-wheel about said vertical axis relative to said driving-element causes rotation of said tread in a horizontal plane against said driving-element approximately about said centreline, thereby remaining in rolling contact with substantially the same perimetrical surace-portion of said driving-element regardless of the width or transverse cross-sectional configuration of the perimeter of said driving element.

2. The propulsion unit according to claim 1 which includes two intermeshing elements the perimetrical surface of each of which is spur-geared for contact with said tread, and, as viewed on a rotary axial plane thereof is seen to embody two inwardly converging frusto-conical parts, the spur gearing of one-half being staggered relative to that of the other part, the perimeters of the outmost portions of said two parts of both elements also being spur-geared but cylindrical for intermeshing as aforesaid.

3. The vehicle according to claim 1 in which said framework is essentially entirely on one side of the vertical axial plane of said steerable traction-wheel, seat-supporting means connected cantileverwise to said framework and extending over said traction-wheel, and an operator's seat on the opposite side of said vertical axial plane partially to counter-balance the same framework and weight carried thereby thus increasing the tractive coefficient of said traction-wheel when said seat is occupied.

4. The vehicle according to claim 1 in which said framework comprises a chassis and fork assembly, said pivotal connection of said traction-wheel to said framework also connecting said chassis and fork assembly in swivelling relationship.

5. The vehicle according to claim 4 in which said propulsion unit is connected to said chassis for limited rotation in a vertical plane and includes means for effecting such rotation.

6. The vehicle according to claim 4 in which said propulsion unit includes (a) a pair of frictionally inter-contacting, oppositely rotation driving elements within said supporting structure, and (b) a speed reduction assembly external of said supporting structure, said source of power being mounted on said chassis and operatively connected to one part of said speed reduction assembly, another part of said speed reduction assembly being operatively connected to one of said inter-contacting elements whereby said speed reduction assembly may rotate through a limited arc in a vertical plane about the point by which it is operatively connected to said element, independently of said supporting structure but responsive to the load on said last mentioned element.

7. The vehicle according to claim 4 which includes manually operable steering means including a steering-wheel or the like connected to said fork assembly in the vicinity of said pivotal connection, for exerting an opposite turning movement at said pivotal connection between said chassis and said fork assembly.

8. The vehicle according to claim 4 in which said steering means are mounted upon said fork assembly, and comprise (a) a manually operable steering sub-assembly journalled for rotation at a point on said fork assembly horizontally offset from the point at which said chassis and fork assembly are pivotally connected, and (b) motion-transmitting means extending between said steering sub-assembly and said pivotal connection whereby an opposite turning movement is produced between said chassis and said fork assembly to reduce friction between said traction wheel and said propulsion unit.

9. The vehicle according to claim 1 in which said propulsion unit includes a supporting-structure connected to said chassis.

10. The vehicle according to claim 1 in which said traction-wheel is positioned at the rear thereof when same is travelling in a forward direction.

11. The vehicle according to claim 1 in which said framework comprises a chassis and a fork assembly pivotally connected thereto, said traction-wheel being journalled in said fork assembly, and in which said propulsion unit includes a supporting structure, an upper and a lower frictionally inter-contacting driving element each journalled in said supporting structure for rotation about a horizontal axis, said supporting structure being connected to said chassis for limited rotation, and means for effecting such rotation whereby either the upper or the lower of said elements may be moved into said driving contact with said traction-wheel for forward or reverse travel.

12. The vehicle according to claim 1 in which said framework comprises a chassis and a fork assembly pivotally connecting said chassis and fork assembly in swivelling relationship, said propulsion unit including a pair of said driving elements each rotatable about a concentric rotary axis, said elements being of substantial length between their ends, and have external surfaces which are recessed as viewed in elevation between said ends.

13. The vehicle according to claim 1 in which said framework comprises a chassis and a fork assembly pivotally connected thereto, said traction-wheel being journalled in said fork assembly, and in which said propulsion unit includes a supporting structure, an upper and a lower frictionally inter-contacting driving element each journalled in said supporting structure for rotation about a horizontal axis, said supporting structure being connected to said chassis for limited rotation, and means for effecting such rotation whereby either the upper or the lower of said elements may be moved into said driving contact with said traction-wheel for forward or reverse travel.

References Cited by the Examiner

UNITED STATES PATENTS

| | | | |
|---|---|---|---|
| 656,491 | 8/1900 | Valentine | 180—74 |
| 676,409 | 1/1901 | Berger | 180—74 |
| 1,541,236 | 6/1925 | Schmelzer | 230—275 |
| 1,565,732 | 12/1925 | Goddard | 180—74 |
| 1,747,627 | 2/1930 | Guth | 230—275 |
| 2,644,540 | 7/1953 | Balzer | 180—26 |
| 2,751,990 | 6/1956 | Finlay et al. | 180—74 X |
| 2,861,643 | 11/1958 | Wald et al. | 180—74 |
| 2,935,333 | 5/1960 | Ekas | 280—92 |
| 3,025,922 | 3/1962 | Savidge | 180—74 X |
| 3,099,326 | 7/1963 | Weigel et al. | 180—26 |
| 3,219,137 | 11/1965 | Appelton | 180—26 |

FOREIGN PATENTS 846,693  6/1939  France.

KENNETH H. BETTS, *Primary Examiner*.